Figure 1:
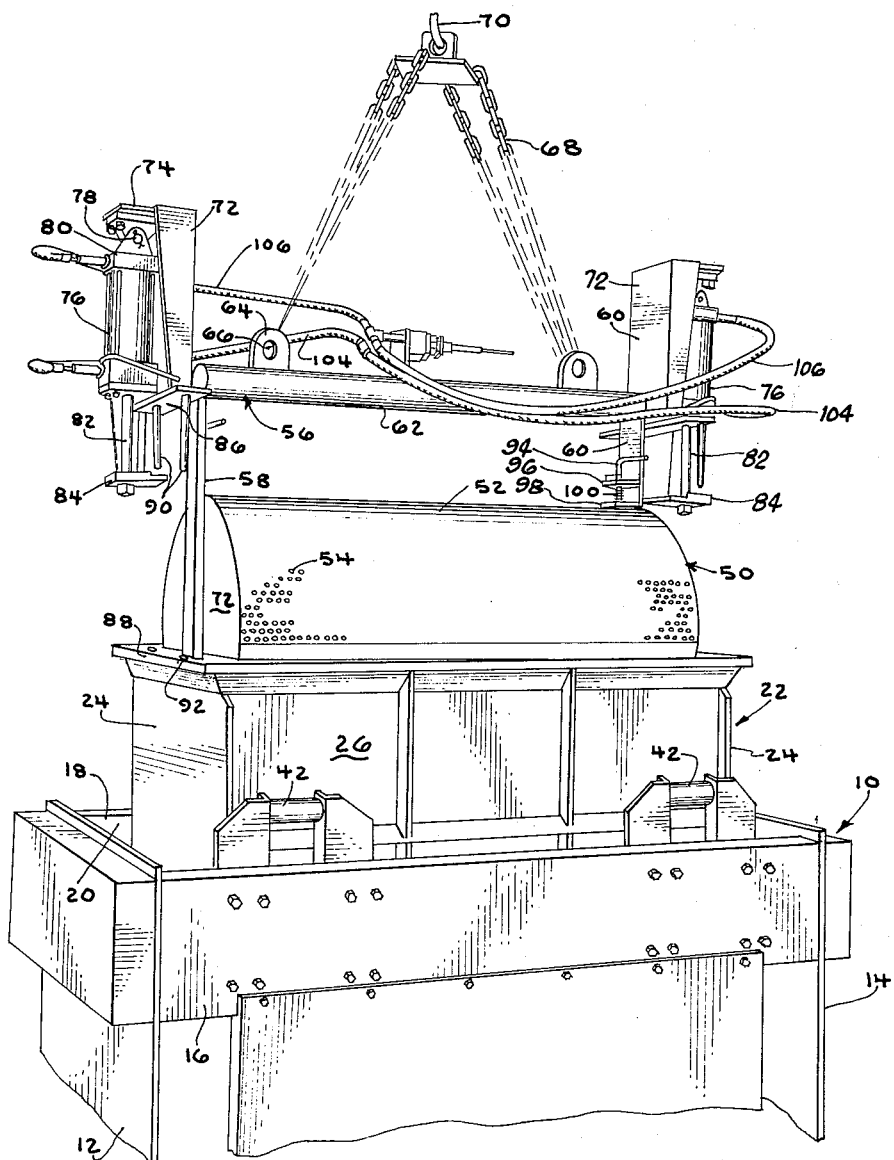

INVENTOR.
PAUL H. SETZLER

July 23, 1963

P. H. SETZLER 3,098,323

MEANS FOR SEPARATION AND REMOVAL OF PARTS
FROM A VIBRATING MACHINE

Filed Nov. 10, 1961

3 Sheets-Sheet 2

INVENTOR.
PAUL H. SETZLER
BY
Ooms, McDougall + Hersh
ATT'YS.

July 23, 1963 P. H. SETZLER 3,098,323
MEANS FOR SEPARATION AND REMOVAL OF PARTS
FROM A VIBRATING MACHINE
Filed Nov. 10, 1961 3 Sheets-Sheet 3

INVENTOR.
PAUL H. SETZLER
BY
Ooms, McDougall & Hersh
ATT'YS.

United States Patent Office 3,098,323
Patented July 23, 1963

3,098,323
MEANS FOR SEPARATION AND REMOVAL OF PARTS FROM A VIBRATING MACHINE
Paul H. Setzler, York, Pa., assignor to Bell Intercontinental Corporation, Mishawaka, Ind., a corporation of Delaware
Filed Nov. 10, 1961, Ser. No. 151,504
6 Claims. (Cl. 51—7)

This invention relates to a machine for the surface treatment of work by reaction with media in vibratory movement and it relates more particularly to a vibratory means for cleaning or abrading the surfaces of parts and a device employed in combination therewith for operation on a batch principle to separate the parts and the media in vibratory motion and for the removal of the separated processed parts from the machine.

Vibratory machines for processing parts in combination with media in vibratory movement to clean or abrade the surfaces of the parts are well known. In a recent development a machine has been produced which embodies means for rocking movement of the bowl mounted for vibratory movement to dump the media and parts when rocked to a dumping position and which is then returned to upright position for reloading with the parts and with media after the latter has been separated from the batch previously dumped. A machine of the type described is illustrated in U.S. Patents No. 2,997,813 and No. 2,997,814, issued August 29, 1961. The foregoing is a more recent innovation intended to overcome some of the time and effort required to load and unload the machine but without embodying means for the separation of parts and media prior to unloading from the machine. For the most part, such machines have not embodied means efficiently to separate the parts and media or to load and unload the machine. As a result, more time is consumed in the loading and unloading of parts and media than is otherwise consumed in the operation of the machine in vibratory movement to process the parts for surface cleaning or abrading. Thus inefficient use is made of the vibratory cleaning and abrading machine and much time and effort is consumed in each cycle of operation thereby materially to increase the cost of operation of the machine.

It is an object of this invention to produce a vibratory machine of the type described embodying new and efficient means for loading and unloading the machine and for separating the parts and the media, while in the machine, thereby to avoid the necessity for unloading the media with the parts and separation of the media and parts in a separate operation externally of the machine. Thus it becomes possible to conserve materially on the requirement of space, equipment and labor.

More specifically, it is an object of this invention to produce an unloading device which can be used in combination with a vibratory machine for cleaning or abrading the surfaces of parts by reaction with a particulate media in vibratory movement; which operates in a simple and efficient manner to separate the parts from the media while still in vibratory movement within the machine; which operates to remove the separated parts from the media leaving the media in the machine for immediate use with the machine in the next cycle of operation; which operates on a batch principle to maintain the separation of parts in each cycle of operation, and which operates materially to reduce the time consumed in a cycle of operation thereby to make more efficient use of the machine.

These and other objects and advantages of this invention will hereinafter appear and, for purposes of illustration, but not of limitation, an embodiment of the invention is shown in the accompanying drawings, in which—

Figure 2:
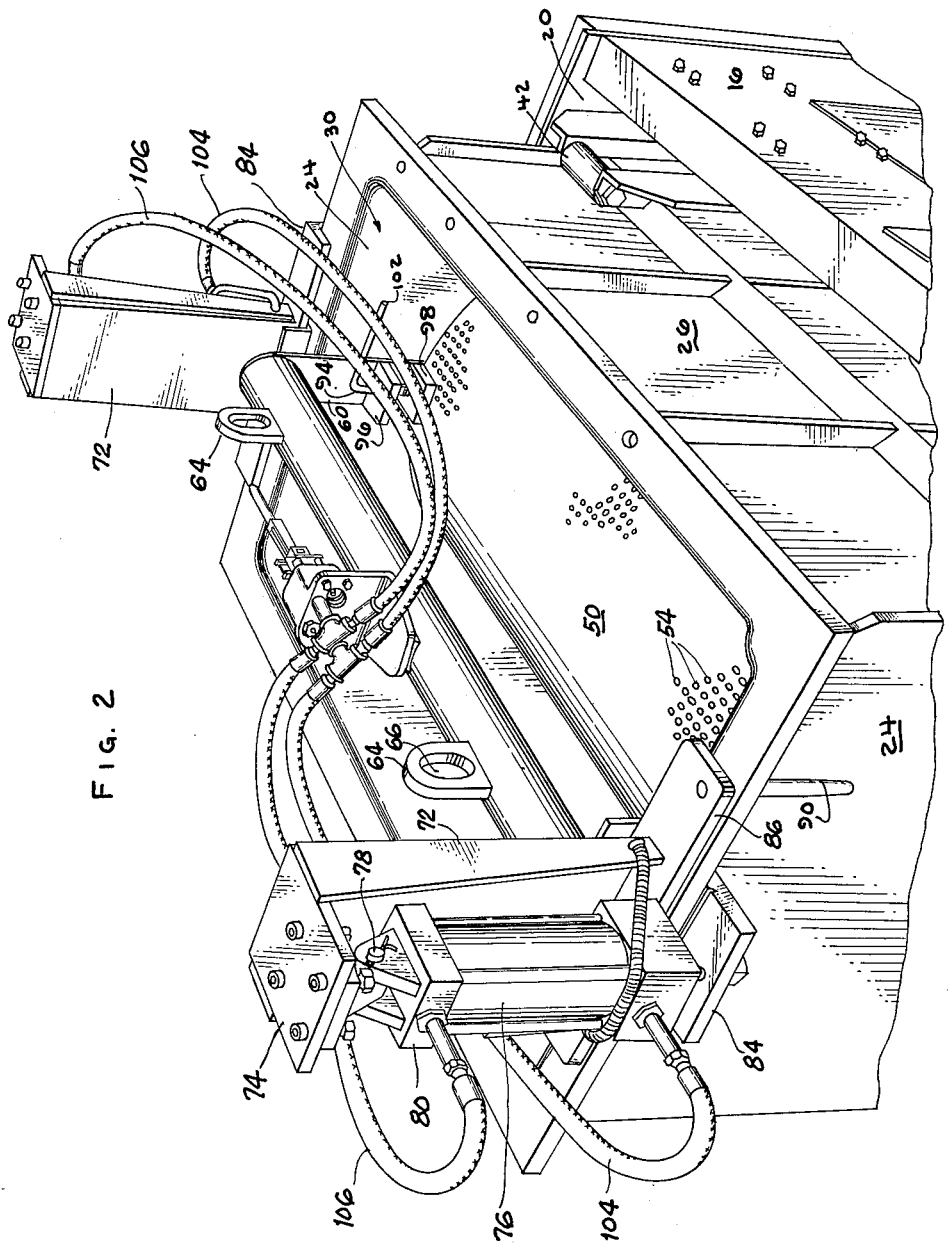
Figure 3:
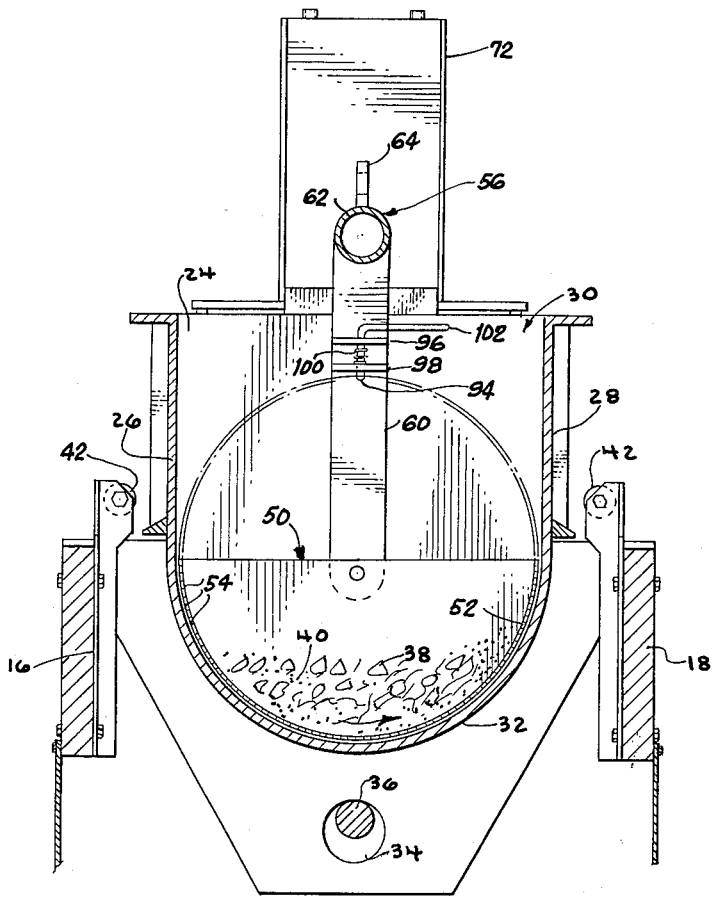

FIG. 1 is a perspective elevational view of the vibratory machine with means embodying the features of this invention for the separation and removal of parts while the elements are in the raised or upright position;

FIG. 2 is a perspective elevational view of the upper portion of the machine shown in FIG. 1 with the means for the separation and removal of parts in lowered position within the bowl but with the bowl still in the upright position; and FIG. 3 is a sectional view taken crosswise of the machine shown in FIG. 2 for illustration of the means for separation and removal of parts in its lowered position within the bowl but in its normal position for the separation of parts from the media.

Since the concepts of this invention are addressed to a means employed in combination with a vibratory unit for imparting vibratory movement to parts and media contained therein, only brief description will be made to a vibratory machine representative of the type with which the concepts of this invention are adapted to be employed. It will be understood that other conventional vibratory machines may be employed in the combinaiton with the means embodying the features of this invention for the separation of parts and media and the removal of the separated parts from the machine.

For a more detailed description of the vibratory machine with which this invention may be practiced, reference can be mdae to the copending applications Ser. No. 124,846 and Ser. No. 124,960, both filed on July 18, 1961, as well as to the aforementioned issued patents.

In the drawings, the vibratory machine is illustrated as being composed of a fixed frame 10 of rectangular shape having stationarily, vertically disposed side, front and back walls 12, 14, 16 and 18 respectively, joined one to the other with an open top which is adapted to receive a bowl 22 in a position partially to extend downwardly into the open end of the frame.

The bowl 22 is also formed to rectangular shape corresponding somewhat to the rectangular shape of the frame but of lesser crosswise and lengthwise dimension to enable the bowl to be received within the open end of the frame.

The bowl is formed of vertically disposed side, front and back walls 24, 26 and 28 respectively, with an open top 30 and a curvilinear bottom wall 32, the latter being preferably formed to a substantially hemispherical shape with the front and back of the curvilinear bottom wall merging with the front and back walls 26 and 28 of the bowl. The bowl is supported within the frame on suitable spring members (not shown), as defined in the aforementioned copending applications and patents, to enable the bowl to be displaced in vibratory movement relative to the frame. Means are provided with the bowl for imparting vibratory movement. One such means, more specifically defined in the aforementioned copending applications, comprises a cylinder 34 eccentrically mounted on a shaft 36 for rotational movement about an axis which extends horizontally in substantially parallel relation with the lengthwise axis of the bowl (which is positioned beneath the bowl for attachment externally to the underside thereof). Rotational movement of the eccentric cylinder about the central axis causes vibratory movement of the bowl in an elliptical path crosswise of the axis so that the material 38 and media 40 in the bowl will tend to roll in a circumferential path down the front wall, across the bottom wall, and up the back wall, as indicated by the arrow in FIG. 3. Rotational movement can be imparted to the shaft by any suitable means, such as an electrical motor suspended from the bowl or arranged externally of the frame, or by means of belts and/or coils adapted to be driven from a suitable power source within or without the frame. In addition to the resilient spring means supporting the bowl for vibratory movement independent of the frame and other spring means which may be interposed between the vertically disposed side walls of the frame and corresponding walls of the bowl continuously to urge the bowl towards a centralized position, the drawings illustrate bumper means 42 arranged in spaced apart relation in position to engage the bowl to prevent excessive deviation during vibratory movement and to minimize impact with the frame.

In the aforementioned patents, the bowl 22 is resiliently supported in a cradle which is pivotally mounted on trunnions for rocking movement relative to the frame from an upright position to a tilted position wherein the contents of the bowl including the material and media are dumped from the bowl for processing separate and apart from the bowl for separating the media for return to the bowl from the material which has been subjected to surface treatment within the bowl.

The concepts of this invention reside in a simple efficient method and means for separation of the material from the media without removal from the bowl. As a result, the bowl can be resiliently mounted within the frame or cradle without the need for rocking movement from upright to tilted position and it becomes unnecessary to provide processing equipment for use in combination with the machine for separation of the material and media and for return of the media to the bowl.

The concepts of this invention reside in a means for separation of the material from the media and the removal of the separated material from the device by means of a bucket 50 dimensioned to be slightly less than the crosswise and lengthwise dimension of the interior of the bowl 24 to enable movement of the bucket into and out of the bowl. The bucket is formed to a curvilinear shape corresponding to the curvature of the bottom wall 32 of the bowl and substantially the entire cylindrical or peripheral wall 52 of the bucket is formed with foramens 54 dimensioned to be smaller than the cross-sectional dimension of the material but larger than the cross-sectional dimensions of the media so that when the bucket receives the material and media, the latter can sift through the bucket while material will be retained therein.

Means are provided for movement of the bucket between a lowered position into the bowl and a raised position clear of the bowl for displacement of the raised bucket to a dumping position at one side of the vibratory machine. For this purpose, there is provided a yoke 56 comprising a pair of longitudinally spaced apart uprights 58 and 60 interconnected at their upper ends by a cross piece 62 having a pair of longitudinally spaced apart ears 64 embodying means, such as openings 66, for engagement by a lift chain 68 connected to a lift mechanism 70, such as a trolley or crane.

The bowl 50 is pivotally supported from the end walls 72 onto the lower end portion of the uprights 58 and 60 for rocking movement of the bucket between an inverted position (shown in FIG. 1) and a normal position (shown in FIG. 3) in which it is suspended from the uprights. The bowl pivot is at or about the axis of the substantially cylindrical section so that when the bowl is in inverted position, it will be positioned between the lower end portions of the uprights, as shown in FIG. 1, and when in normal position, it will be suspended from the lower end portion of the uprights, as in FIG. 3.

Means are provided releasably to latch the bucket in lowered position to militate against retrograde movement of the bucket when rotated from inverted to normal position within the bowl. For this purpose, the yoke is provided with brackets 72 on each end having an upper, horizontally disposed platform 74 from which a hydraulic cylinder 76 is pivotally suspended, as by means of a pin 78 rigid with the platform and in operative engagement with the base 80 of the cylinder for rocking movement of the cylinder about a horizontal axis extending crosswise of the bowl. Rigid with the lower end of the piston 82 is a horizontally disposed plate 84 which is adapted to cooperate with a horizontally disposed plate 86 rigid with the bracket 72 to grip the horizontally disposed shelf 88 at the upper end portion of the bowl therebetween when the yoke is in lowered position to bring the plate 86 into engagement with the top side of the shelf 88 and when the horizontally disposed plate 84 is in raised position to grip the underside of the shelf. The plates 86 are each provided with one or more vertically disposed, laterally spaced apart positioning rods 90 and the shelves are provided with correspondingly arranged openings 92 through which the rods are adapted to be displaced properly to align the yoke and bucket with reference to the bowl when the bucket is displaced to and from lowered position within the bowl.

Means are also provided releasably to latch the bucket in the inverted position. One such means, illustrated in FIGS. 1 and 2, comprise a vertically disposed bolt 94 supported between a pair of horizontally disposed, vertically spaced apart plates 96 and 98 having vertically aligned openings through which the bolt is shiftable between a lowered or latching position and raised or tripped position. The bucket is provided at its bottom side with an opening in vertical alignment with the opening in the support plates 96 and 98 and into which the bolt is adapted to be displaced, when in latching position, to retain the bucket in the inverted position between the uprights. The bolt is resiliently urged towards lowered or latching position, as by means of a coil spring 100 concentric with the portion of the bolt between the plates 96 and 98 and which is attached to the lower end portion to the bolt. A handle portion 102 is provided for manual adjustment of the bolt between latching and tripped position.

Having described the construction, illustration will now be made of a complete cycle of operation of the device.

At the start of the cycle, the yoke 56 and the bucket 50 will be in raised position and to one side of the vibratory device. The bowl having the media therein will be set into vibratory movement and the material subjected to surface treatment can be introduced into the bowl either before or during vibratory operation of the bowl. While the material and the media are being subjected to vibratory movement for surface treatment, the bucket will be latched by the bolt 94 in inverted position between the uprights and the yoke can be displaced into position to bring the bucket into vertical alignment with the bowl.

When the surface treatment has been substantially completed with the material in vibratory movement with the media, the yoke 56 is lowered by the chain 68 to project the pins 90 through the openings 92 in the shelf for alignment and to bring the bucket into the bowl in lowered position. During such lowering movement, the fluid cylinders 76 are rocked outwardly about their pivots to enable the plates 84 to clear the shelves 88 whereby the plates 84 become positioned adjacent the underside of the shelves while the plates 86 come to rest on the top side of the shelves. When the yoke has been displaced to lowered position, air or other fluid under pressure is introduced through lines 104 into the head end of the cylinder to cause displacement of the piston 82 and plate 84 to raised position into strong engagement with the underside of the shelves 88. This operates also to bring the plate 86 into firm engagement with the top side of the shelves accurately to hold the yoke in the lowered position of adjustment.

When the yoke has been properly positioned, the bolt 94 can be tripped to enable rocking movement of the bucket from inverted to normal position, responsive to gravitational force, preferably operating as by means of an offset or weight to rock the bucket for rotational movement in the clockwise direction opposite to that of the roll of the material and media in vibratory movement. As the bucket rotates from inverted to normal position, while in lowered position within the bowl, the material and media become displaced into the bucket until substantially the entire bath of material and media becomes located within the bucket as it rotates to normal position. Vibratory movement of the bowl continues to cause vibratory movement of the material and media within the bucket.

When it is desired to separate the material from the media, without handling the media, the bucket is raised a short distance in the bowl whereby continued vibratory movement causes the media to sift through the foramens in the bucket while the material remains therein to cause separation. When the separation has been completed, the yoke is dpislaced upwardly to raised position until the bucket clears the bowl and the frame of the machine. The bucket can then be displaced laterally to dumping position after which the bucket can be inverted to dump the treated material. To enable the bucket to be raised, the fluid or hydraulic cylinder is operated to introduce pressure fluid through line 106 into the base end of the cylinder to displace the piston 82 and plate 84 from engagement with the shelf to release the yoke for movement from its lowered position.

The described cycle can be repeated to effect batch treatment of material without handling the media or the like.

It will be apparent from the foregoing that I have provided a simple and efficient means for unloading a vibratory cleaning or abrading device to effect the removal of treated parts without concurrently causing removal of the media and whereby such separation can be effected during the vibratory movement for continued treatment of the materials and which relies upon such vibratory movement to effect the desired displacement of the separating elements and corresponding separation of the material from the media.

It will be understood that changes may be made in the details of construction, arrangement and operation without departing from the spirit of the invention, especially as defined in the following claims.

I claim:

1. In a machine for the treatment of the surfaces of material with media in vibratory movement including a bowl having an open top and a rounded bottom, means supporting the bowl for vibratory movement and means for imparting vibratory movement to the bowl, the improvement which comprises means for separation of the material from the media within the bowl and for removing the separated material from the bowl without the handling of the media, comprising a bucket mounted for vertical movement into and out of the open end of the bowl between a lowered position and a raised position in which the bucket is clear of the bowl, said bucket having a rounded bottom corresponding to the rounded bottom of the bowl and in which the rounded bottom is formed with foramens dimensioned to be larger than the media but smaller than the material, means mounting the bucket for rotational movement about an axis which substantially corresponds to the central axis of the rounded bottom of the bowl when the bucket is in lowered position within the bowl whereby the bucket is rotatable to an upright position concentric with the rounded bottom of the bowl, and means for releasably latching the bucket in an inverted position for first insertion into the bowl whereby, when the bowl is released from the latching means, the bowl can rotate about its axis to displace material and media from the bottom of the bowl into the bucket and whereby, when the bucket is raised from lowered position within the bowl, the continued vibrational movement causes the media to sift through the foramens of the bucket to separate the material from the media.

2. A machine as claimed in claim 1 which includes means for securing the bucket in its lowered position in the bowl.

3. A machine as claimed in claim 2 in which the securing means comprises a clamping means between the bucket and the bowl.

4. A machine as claimed in claim 1 in which the means mounting the bucket comprises a pair of uprights spaced longitudinally by an amount less than the lengthwise dimension across the open end of the bowl to enable displacement of the uprights into the bowl and means rotatably mounting the bucket onto a lower end portion of the uprights for rotational movement between an inverted and an upright position and means for displacement of the uprights vertically to clear the bowl and horizontally to displace the bucket into and out of vertical alignment with the bowl.

5. A machine as claimed in claim 1 which includes horizontally disposed, outwardly extending flanges on the upper end portion of the bowl, a pair of clamping plates one of which is rigid with the means mounting the bucket and positioned to rest upon the top side of the flange when the bucket is in lowered position and the other of which is shiftable vertically in the direction toward and away from the bottom side of the one plate to clamp the flange therebetween when in raised position to secure the bucket in its lowered position in the bowl, and means for actuating the shiftable plate toward and away from the raised position.

6. A machine as claimed in claim 5 in which the means for actuating the shiftable plate toward and away from raised position comprises a fluid cylinder and piston arrangement, and means pivotally mounting the piston and cylinder from the support for rocking movement in the direction toward and away from the flange to enable the shiftable plate to clear the flange when the support is displaced between raised and lowered positions.

References Cited in the file of this patent

UNITED STATES PATENTS

| | | |
|---|---|---|
| 2,161,125 | Bigelow | June 6, 1939 |
| 2,628,460 | Zinty | Feb. 17, 1953 |
| 2,997,814 | Brandt | Aug. 29, 1961 |